United States Patent [19]

Benjamin et al.

[11] Patent Number: 4,939,300
[45] Date of Patent: Jul. 3, 1990

[54] ARYLSUBSTITUTED AMIDINES

[75] Inventors: Linda A. Benjamin, Philadelphia, Pa.; Joseph E. Barbiarz, Dobbs Ferry, N.Y.; Stephen D. Pastor, Basel, Switzerland

[73] Assignee: Ciba-Geigy Corporation, Ardsley, N.Y.

[21] Appl. No.: 121,181

[22] Filed: Nov. 16, 1987

[51] Int. Cl.$^5$ ............................................. C07C 123/00
[52] U.S. Cl. ................................. 564/225; 564/512; 564/305; 564/371; 558/9
[58] Field of Search ............... 564/512, 225, 305, 371; 558/9

[56] References Cited

U.S. PATENT DOCUMENTS

| | | | |
|---|---|---|---|
| 3,214,471 | 10/1965 | Clemens | 564/512 |
| 3,598,800 | 8/1971 | Gatzi | 564/225 |
| 4,152,348 | 5/1979 | Rabourn | 558/9 |

OTHER PUBLICATIONS

J. Org. Chem., 12, 303–307 (1947).
Bull. Chem. Soc. Jpn., 44, 2171 (1971).
Recl. Tran. Chem. Pays. Bas., 88 (3), 289 (1969).
J. Am. Chem. Soc., 83, 2588(1961).
Angew. Chem. Intern. Ed. Engl., 5, 132 (1966).
Chem. Ber., 101, 1885 (1968).
Chem. Ber., 94, 3109 (1961).

*Primary Examiner*—Mary C. Lee
*Assistant Examiner*—Robert C. Whittenbaugh
*Attorney, Agent, or Firm*—Luther A. R. Hall; Harry Falber

[57] ABSTRACT

Aminic orthoester derivatives of the formulae

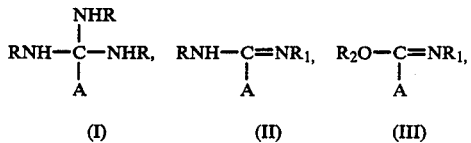

are effective in stabilizing organic materials against oxidative, thermal and actinic degradation.

3 Claims, No Drawings

ARYLSUBSTITUTED AMIDINES

Organic polymeric materials such as plastics and resins are subject to thermal, oxidative and photodegradation. A great variety of stabilizers are known in the art for stabilizing a diversity of substrates. Their effectiveness varies depending upon the causes of degradation and the substrate stabilized. For example, stabilizer effectiveness in reducing volatility may depend upon preventing bond scission in the substrate molecule. Limiting embrittlement and retaining elasticity in a polymer or rubber may require prevention of excessive crosslinking and/or chain scission. Prevention of discoloration may require inhibiting reactions which yield new chromophores or color bodies in the substrate or stabilizer. Problems of process stability and incompatibility must also be considered.

Various aminic orthoesters are known in the art. For example, triphenyltriaminomethane derivatives are disclosed and characterized in C. Lewis et al., *J. Org. Chem.*, 12, 303–307 (1947). Tri-N-aryl-N-alkylaminomethane derivatives and corresponding formamidines are disclosed in U.S. Pat. No. 3,214,471 as pesticides and polymerization inhibitors as well as in O. Tsuge et al., *Bull. Chem. Soc. Jpn.*, 44, 2171 (1971); J. Scheeren, *Recl. Trav. Chim. Pays. Bas.*, 88 (3), 289 (1969); and D. Clemens, *J. Am. Chem. Soc.*, 83, 2588 (1961). Finally, tri-N,N-dialkylaminomethane derivatives and corresponding formamidines are disclosed in H. Bredereck et al., *Angew. Chem. Intern. Ed. Engl.*, 5, 132 (1966); H. Bredereck et al., *Chem. Ber.*, 101, 1885 (1968); and H. Bohme, *Chem. Ber.*, 94, 3109 (1961). These various articles are directed to synthesis and mechanistic studies.

It has now been determined that the compositions of this invention exhibit a variety of desirable properties stemming from the presence therein of the indicated aminic orthoester derivatives. Thus, the compounds serve to protect various substrates such as polyolefins, elastomers and lubricating oils against the adverse effects of oxidative and thermal degradation. They are most effective as process stabilizers in polyolefin compositions which may contain metal salts of fatty acids and which also contain a phenolic antioxidant.

Thus the primary object of this invention is to provide compositions of organic materials stabilized against oxidative, thermal and actinic degradation by the presence therein of a class of aminic orthoester derivatives.

It is a further object to provide a specific class of novel aminic orthoester derivatives which likewise exhibits a broad range of improved stabilization performance characteristics.

Various other objects and advantages of this invention will become evident from the following description thereof.

The stabilizing compounds utilized in the compositions of the invention correspond to the formulae

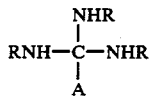  (I)

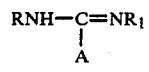  (II)

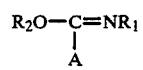  (III)

wherein

R and $R_1$ independently are $C_1$–$C_{30}$ alkyl, $C_1$–$C_{30}$ alkyl substituted by alkoxy of 1 to 12 carbon atoms, by amino, by aryl of 6 to 10 carbon atoms or by arylthio of 6 to 10 carbon atoms; $C_5$–$C_{12}$ cycloalkyl, $C_6$–$C_{10}$ aryl or said aryl substituted by $C_1$–$C_{18}$ alkyl, halogen or —$NHR_3$ wherein $R_3$ is $C_1$–$C_{18}$ alkyl or phenyl;

$R_2$ is $C_1$–$C_{30}$ alkyl; and

A is hydrogen, $C_1$–$C_{30}$ alkyl, $C_1$–$C_{30}$ alkyl substituted by alkoxy of 1 to 12 carbon atoms, by amino, by aryl of 6 to 10 carbon atoms or by arylthio of 6 to 10 carbon atoms; $C_5$–$C_{12}$ cycloalkyl, $C_6$–$C_{10}$ aryl or $C_6$–$C_{10}$ aryl substituted by $C_1$–$C_{18}$ alkyl.

The R and $R_1$ groups are preferably straight chain or branched alkyl of 1 to 18 carbon atoms such as methyl, ethyl, n-propyl, n-butyl, n-octyl, 2-ethylhexyl, decyl, dodecyl and octadecyl; cyclopentyl and cyclohexyl; phenyl; and phenyl substituted by $C_1$–$C_8$ alkyl and/or halogen or —NH phenyl. $R_2$ is preferably $C_1$–$C_{18}$ alkyl as exemplified above. The above noted R and $R_1$ group definition equally applies to the A groups, with A preferably being hydrogen.

Preferred formula I compounds have all R groups identical and all R groups are phenyl or $C_1$–$C_8$ alkyl-substituted phenyl, with A being hydrogen.

Preferred formula II compounds have $R = R_1$ and R and $R_1$ are phenyl or phenyl substituted by $C_1$–$C_8$-alkyl or by —NH— phenyl, with A being hydrogen.

Preferred formula III compounds have R1 as phenyl or $C_1$–$C_8$ alkyl-substituted phenyl, $R_2$ as $C_1$–$C_8$ alkyl and A as hydrogen.

Processes for preparing the compounds are described in the above mentioned publications. In general, the appropriately substituted amine is reacted with a trialkyl orthoformate, preferably triethyl orthoformate, at elevated temperatures to give the desired product. Preparation of the corresponding formamidines and imidates is largely dictated by the nature of the substitution on the amine reactants.

Certain of the aminic orthoesters are novel and thus form part of the instant invention. The novel compounds correspond to formulae I–III with the exception that A cannot be hydrogen when R is phenyl or halogen-substituted phenyl in formula I. The above noted illustrative material equally applies to these compounds.

The compounds utilized in the present invention are particularly effective in stabilizing organic materials subject to oxidative, thermal and actinic degradation, such as plastics, polymers and resins.

Substrates in which these compounds are particularly useful are polyolefins such as polyethylene and polypropylene; polystyrene, including impact polystyrene, ABS resin, SBR, isoprene, as well as natural rubber, polyesters including polyethylene terephthalate, including copolymers, and lubricating oils such as those derived from mineral oil.

In general polymers which can be stabilized include
1. Polymers of monoolefins and diolefins, for example polyethylene (which optionally can be crosslinked), polypropylene, polyisobutylene, polybutene-1, polymethylpentene-1, polyisoprene or polybutadiene, as well as polymers of cycloolefins, for instance of cyclopentene or norbornene.

2. Mixtures of the polymers mentioned under 1), for example mixtures of polypropylene with polyisobutylene.

3. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidene-norbornene.

4. Polystyrene, poly-(p-methylstyrene).

5. Copolymers of styrene or methylstyrene with dienes or acrylic derivatives, such as, for example, styrene/butadiene, styrene/acrylonitrile, styrene/ethyl methacrylate, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.

6. Graft copolymers of styrene, such as, for example, styrene on polybutadiene, styrene and acrylonitrile on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under 5), for instance the copolymer mixtures known as ABS-, MBS-, ASA- or AES-polymers.

7. Halogen-containing polymers, such as polychloroprene, chlorinated rubbers, chlorinated or sulfochlorinated polyethylene, epichlorohydrin homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate or vinylidene chloride/vinyl acetate copolymers.

8. Polymers which are derived from $\alpha,\beta$-unsaturated acids and derivatives thereof, such as polyacrylates and polymethacrylates, polyacrylamide and polyacrylonitrile.

9. Copolymers from the monomers mentioned under (8) with each other or with other unsaturated monomers, such as, for instance, acrylonitrile/butadiene, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinylbutyral, polyallyl phthalate or polyallylmelamine.

11. Homopolymers and copolymers of cyclic ethers, such as polyalkylene glycols, polyethylene oxide, polypropylene oxide or copolyers thereof with bis-glycidyl ethers.

12. Polyacetals, such as polyoxymethylene and those polyoxymethylenes which contain ethylene oxide as comonomer.

13. Polyphenylene oxides and sulfides, and mixtures of polyphenylene oxides with polystyrene.

14. Polyurethanes which are derived from polyethers, polyesters or polybutadiens with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamide or poly-m-phenylene isophthalamide, as well as copolymers thereof with polyethers, such as for instance with polyethylene glycol, polypropylene glycol or polytetramethylene glycols.

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane] terephthalate and polyhydroxybenzoates as well as block-copolyether-esters derived from polyethers having hydroxyl end groups.

18. Polycarbonates.

19. Polysulfones, polyethersulfones and polyetherketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low flammability.

23. Thermosetting acrylic resins, derived from substituted acrylic esters, such as epoxy-acrylates, urethane-acrylates or polyester acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.

26. Natural polymers, such as cellulose, rubber, gelatin and derivatives thereof which are chemically modified in a polymer homologous manner, such as cellulose acetates, cellulose propionates and cellulose butyrates, or the cellulose ethers, such as methylcellulose.

27. Mixtures of polymers as mentioned above, for example PP/EPDM, Polyamide 6/EPDM or ABS, PVC/EVA, PVC/ABS, PVC/MBS, PC/ABS, PBTP/ABS.

28. Naturally occuring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, which materials may be used as plasticizers for polymers or as textile spinning oils, as well as aqueous emulsions of such materials.

29. Aqueous emulsions of natural or synthetic rubber, e.g. natural latex or latices of carboxylated styrene/butadiene copolymers.

In general, the compounds of the present invention are employed in from about 0.01 to about 5% by weight of the stabilized composition, although this will vary with the particular substrate and application. An advantageous range is from about 0.05 to about 2%, and especially 0.1 to about 1%.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain various conventional additives, such as the following.

1. Antioxidants 1.1. Alkylated monophenols, for example,
2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert.butyl-4-methoxymethylphenol 1.2. Alkylated hydroquinones, for example,
2,6-di-tert.butyl-4-methoxyphenol
2,5-di-tert.butyl-hydroquinone
2,5-di-tert.amyl-hydroquinone
2,6-diphenyl-4-octadecyloxyphenol 1.3. Hydroxylated thiodiphenyl ethers, for example
2,2'-thio-bis-(6-tert.butyl-4-methylphenol)
2,2'-thio-bis-(4-octylphenol)
4,4'-thio-bis-(6-tert.butyl-3-methylphenol)
4,4'-thio-bis-(6-tert.butyl-2-methylphenol)

1.4. Alkylidene-bisphenols, for example,
2,2'-methylene-bis-(6-tert.butyl-4-methylphenol)
2,2'-methylene-bis-(6-tert.butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
4,4'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl-butane
2,6-di-(3-tert.butyl-5-methyl-2-hydroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane
ethylenglycol-bis-[3,3-bis-(3'-tert.butyl-4'-hydroxyphenyl)-butyrate]
di-(3-tert.butyl-4-hydroxy-5-methylphenyl)-dicyclopentadiene
di-[2-(3'-tert.butyl-2'-hydroxy-5'-methyl-benzyl)-6-tert.-butyl-4-methylphenyl]-terephthalate.

1.5. Benzyl compounds, for example,
1,3,5-tri-(3,5-di-tert.butyl-4-hydroxybenzyl)-2,4,6-trimethylbenzene-di-(3,5-di-tert.butyl-4-hydroxybenzyl)sulfide
3,5-di-tert.butyl-4-hydroxybenzyl-mercapto-acetic acid isooctyl ester
bis-(4-tert.butyl-3-hydroxy-2,6-dimethylbenzyl)dithiol-terephthalate
1,3,5-tris-(3,5-di-tert.butyl-4-hydroxybenzyl)-isocyanurate
1,3,5-tris-(4-tert.butyl-3-hydroxy-2,6-dimethylbenzyl)-isocyanurate
3,5-di-tert.butyl-4-hydroxybenzyl-phosphoric acid-dioctadecyl ester
3,5-di-tert.butyl-4-hydroxybenzyl-phosphoric acid-monoethyl ester, calcium-salt 1.6. Acylaminophenols, for example,
4-hydroxy-lauric acid anilide
4-hydroxy-stearic acid anilide
2,4-bis-octylmercapto-6-(3,5-tert.butyl-4-hydroxyanilino)-s-triazine
octyl-N-(3,5-di-tert.butyl-4-hydroxyphenyl)-carbamate 1.7. Esters of β-(3,5-di-tert-butyl-4-hydroxyphenyl)-propionic acid with monohydric or polyhydric alcohols, for example,

| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.8. Esters of β-(5-tert-butyl-4-hydroxy-3-methylphenyl)-propionic acid with monohydric or polyhydric alcohols, for example,

| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.9. Amides of β-(3,5-di-tert.butyl-4-hydroxyphenyl)-propionic acid for example,
N,N'-di-(3,5-di-tert.butyl-4-hydroxyphenylpropionyl)-hexamethylenediamine
N,N'-di-(3,5-di-tert.butyl-4-hydroxyphenylpropionyl)-trimethylenediamine
N,N'-di-(3,5-di-tert.butyl-4-hydroxyphenylpropionyl)-hydrazine 2. UV absorbers and light stabilizers 2.1. 2-(2'-Hydroxyphenyl)-benzotriazoles, for example, the 5'-methyl-, 3',5'-di-tert.butyl-, 5'-tert.butyl-, 5'-(1,1,3,3-tetramethylbutyl)-, 5-chloro-3',5'-di-tert.-butyl-, 5-chloro-3'-tert.butyl-5'-methyl-, 3'-sec.butyl-5'-tert.butyl-, 4'-octoxy, 3',5'-di-tert.amyl-, 3',5'-bis-(α,α-dimethylbenzyl)-derivative.

2.2. 2-Hydroxy-benzophenones,
for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivative.

2.3. Esters of optionally substituted benzoic acids
for example, phenyl salicylate, 4-tert.butyl-phenylsalicylate, octylphenyl salicylate, dibenzoylresorcinol, bis-(4-tert.-butylbenzoyl)-resorcinol, benzoylresorcinol, 3,5-di-tert.-butyl-4-hydroxybenzoic acid 2,4-di-tert.butyl-phenyl ester and 3,5-di-tert.-butyl-4-hydroxybenzoic acid hexadecyl ester.

2.4. Acrylates,
for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxycinnamic acid methyl ester, N-(β-carbomethoxy-β-cyano-vinyl)-2-methyl-indoline.

2.5 Nickel compounds,
for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert.butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazol, optionally with additional ligands.

2.6. Sterically hindered amines,
for example bis-(2,2,6,6-tetramethylpiperidyl)-sebacate, bis-(1,2,2,6,6-pentamethylpiperidyl)-sebacate, n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert.octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butanetetracarbonic acid, 1,1'(1,2-ethanediyl)-bis-(3,3,5,5-tetramethylpiperazinone).

2.7 Oxalic acid diamides,
for example, 4,4'-di-octyloxyoxanilide, 2,2'-di-octyloxy-5,5'-di-tert.butyl-oxanilide, 2,2'-di-dodecyloxy-5,5'-di-tert.butyl-oxanilide, 2-ethoxy-2'-ethyl-oxanilide, N,N'-bis(3-dimethylaminopropyl)oxalamide, 2-ethoxy-5-tert.butyl-2'-ethyloxanilide and its mixture with 2-ethoxy-2'-ethyl-5,4'-di-tert.butyloxanilide and mixtures of ortho- and para-methoxy-as well as of o- and p-ethoxy-disubstituted oxanilides.

3. Metal deactivators,
for example, N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino-1,2,4-triazole, bis-benzylidene-oxalic acid dihydrazide.

4. Phosphites and phosphonites,
for example, triphenyl phosphite, diphenylalkyl phosphites, phenyldialkyl phosphites, tri-(nonylphenyl)-phosphite, trilauryl phosphite, trioctadecyl phosphite, di-stearyl-pentaerythritol diphosphite, tris-(2,4-di-tert.butylphenyl) phosphite, di-isodecylpentaerythritol diphosphite, di-(2,4-di-tert.butylphenyl)pentaerythritol diphosphite, tristearylsorbitol triphosphite, tetrakis-(2,4-di-tert.butylphenyl)-4,4'-diphenylylenediphosphonite.

5 5. Compounds which destroy peroxide,
for example, esters of β-thiodipropionic acid, for example the lauryl, stearyl, myristyl or tridecyl esters, mercapto-benzimidazole or the zinc salt of 2-mercaptobenzimidazole, zinc-dibutyl-dithiocarbamate, dioctadecyl-disulfide, pentaerythritol-tetrakis-(β-dodecylmercapto)-propionate.

6. Polyamide stabilizers,
for example copper salts in combination with iodides and/or phosphorus compounds and salts of divalent manganese.

7. Basic co-stabilizers,
for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Nucleating agents,
for example, 4-tert.butyl-benzoic acid, adipic acid, diphenylacetic acid.

9. Fillers and reinforcing agents,
for example, calcium carbonate, silicates, glass fibers, asbestos, talc, kaolin, mica, barium sulfate, metal oxides and hydroxides, carbon black, graphite.

10. Other additives,
for example, plasticizers, lubricants, emulsifiers, pigments, optical brighteners, flameproofing agents, antistatic agents, blowing agents and thiosynergists such as dilaurylthiodipropionate or distearylthiodipropionate.

Still another group of coadditives which can be advantageously used in conjunction with the instant aminic orthoesters are the hydroxylamines such as N,N-dialkylhydroxylamines and the N,N-diaralkylhydroxylamines. Examples of such hydroxylamines include the N,N-dialkylhydroxylamines with alkyl of 1 to 18 carbon atoms, preferably alkyl of 8 to 18 carbon atoms; and N,N-dibenzylhydroxylamine and substituted N,N-dibenzylhydroxylamines where the benzyl moiety is substituted by alkyl of 1 to 12 carbon atoms or by alpha,alpha-dimethylbenzyl.

The following examples illustrate the embodiments of this invention. Thus, they describe the preparation of various aminic orthoesters, including those forming part of the invention, and of stabilized compositions. In these examples, all parts given are by weight unless otherwise specified.

EXAMPLE 1

1,1,1-Tris(anilino)methane

A solution of 10.0 g (0.11 mol) of aniline in 5.3 g (0.036 mol) of triethyl orthoformate is heated to reflux and the resultant ethanol is distilled off. The residue is slurried with cyclohexane to give 8.2 g (79%) of a white solid, mp. 138°-139° C.

Anal. Calcd. for $C_{19}H_{19}N_3$: C, 78.9; H, 6.6; N, 14.5. Found: C, 78.9; H, 6.2; N, 14.2.

EXAMPLE 2

1,1,1-Tris(4-methylanilino)methane

The procedure of Example 1 is repeated using 13.3 g (0.124 mol) of 4-methylaniline and 5.9 g (0.04 mol) of triethyl orthoformate. The residue is slurried with cyclohexane to give 6.7 g (51%) of a white solid, mp. 130°-131° C.

Anal. Calcd. for $C_{22}H_{25}N_3$: C, 79.7; H, 7.6; N, 12.7. Found: C, 79.7; H, 7.2; N, 12.4.

EXAMPLE 3

1,1,1-Tris(4-tert-butylanilino)methane

The procedure of Example 1 is repeated using 7.0 g (0.047 mol) of 4-tert-butylaniline and 3.7 g (0.025 mol) of triethyl orthoformate. The residue is recrystallized from hexane/cyclohexane to give 4.9 g (68%) of a white solid, mp. 157°-158° C.

Anal. Calcd. for $C_{31}H_{43}N_3$: C, 81.4; H, 9.5; N, 9.2. Found: C, 81.8; H, 9.3; N, 8.9.

EXAMPLE 4

1,1,1-Tris(2-ethylanilino)methane

The procedure of Example 1 is repeated using 10.0 g (0.083 mol) of 2-ethylaniline and 4.5 g (0.03 mol) of triethyl orthoformate. The residue is recrystallized from hexane to give 5.3 g (51%) of a white solid, mp. 76°-78° C.

Anal. Calcd. for $C_{25}H_{31}N_3$: C, 80.4; H, 8.4; N, 11.3. Found: C, 80.8; H, 8.1; N, 11.1.

EXAMPLE 5

N,N'-Bis(4-anilinophenyl)formamidine

The procedure of Example 1 is repeated using 10.0 g (0.054 mol) of N-phenyl-1,4-phenylenediamine and 3.3 g (0.22 mol) of triethyl orthoformate. The residue is slurried with ethanol to give 7.4 g (83%) of a brown solid, mp. 173°-175° C.

Anal. Calcd. for $C_{25}H_{22}N_4$ C, 79.3; H, 5.9; N, 14.8. Found: C, 79.2; H, 5.7; N, 14.8.

EXAMPLE 6

N,N'-Bis(2,6-dimethylphenyl)formamidine

The procedure of Example 1 is repeated using 18.8 g (0.154 mol) of 2,6-dimethylaniline and 8.5 g (0.057 mol) of triethyl orthoformate. The residue is slurried with hexane to give 1.4 g (11%) of a white solid, mp. 174°-176° C.

Anal. Calcd. for $C_{17}H_{20}N_2$: C, 80.9; H, 8.0; N, 11.1. Found: C, 80.5; H, 7.8; N, 11.1.

EXAMPLE 7

Ethyl-N-(2-tert-butyl-6-methylphenyl)imidate

The procedure of Example 1 is repeated using 8.6 g (0.053 mol) of 2-tert-butyl-6-methylaniline and 2.9 g (0.02 mol) of triethyl orthoformate. The residue is distilled giving 7.8 g (67%) of a colorless oil, bp. 89° to 91° C. (0.01 mm).

EXAMPLE 8

Processing of Polypropylene

| Base | Formulation |
| --- | --- |
| Polypropylene* | 100 parts |
| Calcium Stearate | 0.10 parts |

*Profax 6501 from Himont

Stabilizers are solvent blended into polypropylene as solutions in methylene chloride and after removal of the solvent by evaporation at reduced pressure, the resin is extruded using the following extruder conditions:

|  | Temperature (°C.) |
| --- | --- |
| Cylinder #1 | 232 |
| Cylinder #2 | 246 |
| Cylinder #3 | 260 |
| Die #1 | 260 |
| Die #2 | 260 |
| Die #3 | 260 |
| RPM | 100 |

The melt flow rate (MFR) is determined by ASTM method 1238 condition L. The melt flow rate is a measure of the molecular weight for a specific type of polymer. The results are shown in the following table.

| Additive | Conc. (% by wt.) | MFR (g/10 min.) After Extrusion | |
| --- | --- | --- | --- |
|  |  | 1 | 5 |
| Base | — | 4.8 | 23.7 |
| Example 1 | 0.05 | 2.2 | 3.9 |
| Example 2 | 0.05 | 1.8 | 2.9 |

EXAMPLE 9

Example 8 is repeated except that the stabilizers are dry blended into the polypropylene prior to extrusion. The results are noted below.

| Additive | Conc. (% by wt.) | MFR (g/10 min.) After Extrusion | |
| --- | --- | --- | --- |
|  |  | 1 | 5 |
| Base | — | 4.8 | 8.9 |
| Example 3 | 0.05 | 2.6 | 3.2 |
| Example 4 | 0.05 | 2.2 | 3.2 |
| Example 5 | 0.05 | 2.2 | 3.0 |
| Example 6 | 0.05 | 1.9 | 2.0 |

The data in Examples 8 and 9 thus illustrate the effectiveness of the instant compounds as process stabilizers in polypropylene.

EXAMPLE 10

Processing of Neoprene

A polychloroprene masterbatch is prepared in a Banbury BR type internal mixer using the following recipe.

| Neoprene GRT (DuPont) | 100 parts |
| --- | --- |
| Stearic Acid | 1 phr |
| Magnesium Oxide | 4 phr |

| | |
|---|---|
| -continued | |
| Carbon Black | 58 phr |
| Polyethylene (Allied Chemical) | 3 phr |
| Sundex 790 oil (Sun Oil) | 10 phr |

The components are mixed at high speed for one minute with full cooling. The additives and zinc oxide (5 phr) are added to the masterbatch on a cold two roll mix. Test samples are press cured at 160° C. for 20 minutes. Aging is conducted in a circulating air oven at 120° C. for 168 hours using ASTM Die C tensile bars. The tensile strength (T.S.) (in Kg/mm$^2$) and elongation (in %) values are determined according to ASTM D412-75.

| Additive | Conc. (% by wt.) | 120° C. Oven Aging | | | | |
|---|---|---|---|---|---|---|
| | | Unaged | | 168 Hours | | % Retention of Elong. |
| | | T.S. | % Elong. | T.S. | % Elong. | |
| Base | — | 2.0 | 250 | 1.0 | 29 | 11.6 |
| Example 5 | 2.0 | 2.3 | 264 | 1.2 | 54 | 20.4 |

These data further illustrate the effective stabilization activity of the instant compounds.

Summarizing, it is seen that this invention provides organic materials stabilized against degradation by the presence therein of various aminic orthoester derivatives. Variations may be made in proportions, procedures and materials without departing from the scope of the instant invention as defined by the instant claims.

What is claimed is:

1. A compound of formula II

wherein R and R$_1$ are identical and are phenyl or phenyl substituted by C$_1$–C$_8$ alkyl or —NH—phenyl, and A is hydrogen.

2. N,N'-Bis(4-anilinophenyl)formamidine according to claim 1.

3. N,N'-Bis(2,6-dimethylphenyl)formamidine according to claim 1.

* * * * *

UNITED STATES PATENT AND TRADEMARK OFFICE
CERTIFICATE OF CORRECTION

PATENT NO. : 4,939,300

DATED : JULY 3, 1990

INVENTOR(S) : LINDA A. BENJAMIN ET AL.

It is certified that error appears in the above-identified patent and that said Letters Patent is hereby corrected as shown below:

On the cover page, Item [75], second line, should read -- Joseph E. Babiarz --.

Signed and Sealed this

Twenty-second Day of October, 1991

Attest:

HARRY F. MANBECK, JR.

*Attesting Officer*  *Commissioner of Patents and Trademarks*